United States Patent
Peters et al.

(10) Patent No.: US 9,915,228 B2
(45) Date of Patent: Mar. 13, 2018

(54) AIR WITH INTEGRAL SPRING FOR A GAS TURBINE ENGINE EXHAUST DRIVE

(71) Applicant: United Technologies Corporation, Hartford, CT (US)

(72) Inventors: Christopher J. Peters, West Hartford, CT (US); Daniel R. Bowers, Hebron, CT (US)

(73) Assignee: United Technologies Corporation, Farmington, CT (US)

(*) Notice: Subject to any disclaimer, the term of this patent is extended or adjusted under 35 U.S.C. 154(b) by 506 days.

(21) Appl. No.: 14/305,606

(22) Filed: Jun. 16, 2014

(65) Prior Publication Data
US 2015/0050127 A1    Feb. 19, 2015

Related U.S. Application Data

(60) Provisional application No. 61/866,831, filed on Aug. 16, 2013.

(51) Int. Cl.
| F01D 25/30 | (2006.01) |
| F02K 1/80 | (2006.01) |
| F02K 1/00 | (2006.01) |

(52) U.S. Cl.
CPC ............. *F02K 1/80* (2013.01); *F02K 1/004* (2013.01); *F05D 2220/90* (2013.01)

(58) Field of Classification Search
CPC ........ F01D 11/005; F01D 11/02; F01D 25/30; F01D 11/00; F02C 7/28; F16J 15/0887; F02K 1/805
See application file for complete search history.

(56) References Cited

U.S. PATENT DOCUMENTS

| 3,986,687 A | 10/1976 | Beavers et al. |
| 6,065,756 A * | 5/2000 | Eignor ............... F01D 11/005 277/545 |
| 6,318,668 B1 | 11/2001 | Ulanoski et al. |
| 6,352,211 B1 | 3/2002 | Bentley |
| 6,382,559 B1 | 5/2002 | Sutterfield et al. |
| 6,418,727 B1 * | 7/2002 | Rice ..................... F01D 9/023 60/799 |
| 6,869,082 B2 * | 3/2005 | Parker .................... F23R 3/60 277/630 |
| 7,163,206 B2 * | 1/2007 | Cross ..................... F02K 1/004 277/379 |
| 7,246,995 B2 * | 7/2007 | Zborovsky ............ F01D 9/023 415/137 |
| 7,788,932 B2 * | 9/2010 | Kunitake ............... F01D 9/023 60/797 |
| 7,818,957 B2 | 10/2010 | Corsmeier |
| 7,861,535 B2 | 1/2011 | Figueroa et al. |
| 7,966,823 B2 | 6/2011 | Koshoffer et al. |
| 7,975,488 B2 | 7/2011 | Farah et al. |
| 8,015,996 B2 | 9/2011 | Sadil et al. |
| 8,205,821 B2 | 6/2012 | Peck |
| 8,317,126 B2 | 11/2012 | Harris et al. |
| 8,360,361 B2 | 1/2013 | Wadley et al. |

* cited by examiner

*Primary Examiner* — Justin Seabe
(74) *Attorney, Agent, or Firm* — O'Shea Getz P.C.

(57) ABSTRACT

A seal assembly for an exhaust duct section of a gas turbine engine includes a multiple of springs that axially extend from a split hoop opposite a seal surface.

20 Claims, 8 Drawing Sheets

AIR WITH INTEGRAL SPRING FOR A GAS TURBINE ENGINE EXHAUST DRIVE

CROSS-REFERENCE TO RELATED APPLICATION

This application claims priority to U.S. Patent Appln. Ser. No. 61/866,831 filed Aug. 16, 2013, which is hereby incorporated herein by reference in its entirety.

STATEMENT REGARDING FEDERALLY SPONSORED RESEARCH OR DEVELOPMENT

This disclosure was made with Government support under N00019-02-C-3003 awarded by The United States Navy. The Government may have certain rights in this disclosure.

BACKGROUND

The present disclosure relates to a seal assembly and, more particularly, to a seal assembly for a gas turbine engine exhaust duct.

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase the thrust. The increase in thrust is produced when fuel is injected into the core exhaust gases downstream of the turbine section and burned with the oxygen contained therein to generate a second combustion within an exhaust duct which typically includes a convergent/divergent nozzle.

Certain engine architectures advantageously provide the ability to manipulate the exhaust duct to vector thrust and facilitate short takeoff vertical landing (STOVL) operations. Seal assemblies within such an exhaust duct need be operable in both the radial and axial directions over wide and variable temperature ranges. For a STOVL type of exhaust duct, the axial movement is typically about one third of the installed width of the seal assembly. The severe environmental conditions and the relatively large diameters have heretofore required a relatively complicated seal assembly.

SUMMARY

An exhaust duct section for a gas turbine engine is provided according to one disclosed non-limiting embodiment of the present disclosure. This exhaust duct section includes a second exhaust duct adjacent to a first exhaust duct and a seal assembly between the first exhaust duct and the second exhaust duct. The seal assembly includes a split hoop with a seal surface that interfaces with the first exhaust duct and a multiple of springs that extend from the split hoop. The multiple of springs interface with the second exhaust duct.

In a further embodiment of the present disclosure, the seal assembly may be radially outboard of an exhaust duct liner.

In a further embodiment of any of the foregoing embodiments of the present disclosure, the seal assembly may accommodate axial displacement between the first exhaust duct and the second exhaust duct.

In a further embodiment of any of the foregoing embodiments of the present disclosure, the seal assembly may accommodate rotation of the first exhaust duct relative to the second exhaust duct.

In a further embodiment of any of the foregoing embodiments of the present disclosure, the split hoop may be U-shaped in cross-section.

In a further embodiment of any of the foregoing embodiments of the present disclosure, the split hoop may be L-shaped in cross-section.

In a further embodiment of any of the foregoing embodiments of the present disclosure, the split hoop may be radially outboard of a seal carrier.

In a further embodiment of any of the foregoing embodiments of the present disclosure, the seal carrier may be mounted to an annular bulkhead of the second exhaust duct.

In a further embodiment of any of the foregoing embodiments of the present disclosure, the multiple of springs may be radially inboard of a seal retainer.

In a further embodiment of any of the foregoing embodiments of the present disclosure, the seal retainer may be mounted to the annular bulkhead of the second exhaust duct.

In a further embodiment of any of the foregoing embodiments of the present disclosure, the seal surface may interface with the first exhaust duct at a back plate.

In a further embodiment of any of the foregoing embodiments of the present disclosure, the seal surface may interface with the first exhaust duct at a bearing plane to accommodate rotation of the first exhaust duct relative to the second exhaust duct.

In a further embodiment of any of the foregoing embodiments of the present disclosure, the seal assembly may accommodate axial displacement between the first exhaust duct and the second exhaust duct. The multiple of springs may maintain the seal surface interface with the back plate.

A seal assembly for an exhaust duct section of a gas turbine engine is provided according to another disclosed non-limiting embodiment of the present disclosure. This seal assembly includes a split hoop that defines a seal surface and a multiple of springs that axially extend from the split hoop opposite the seal surface.

In a further embodiment of any of the foregoing embodiments of the present disclosure, the split hoop may be U-shaped in cross-section.

In a further embodiment of any of the foregoing embodiments of the present disclosure, the split hoop may be L-shaped in cross-section.

In a further embodiment of any of the foregoing embodiments of the present disclosure, the multiple of springs may be integral with the split hoop.

In a further embodiment of any of the foregoing embodiments of the present disclosure, the multiple of springs may be welded to the split hoop.

In a further embodiment of any of the foregoing embodiments of the present disclosure, the multiple of springs may be fastened to the split hoop.

In a further embodiment of any of the foregoing embodiments of the present disclosure, each of the multiple of springs may be axial wave springs.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
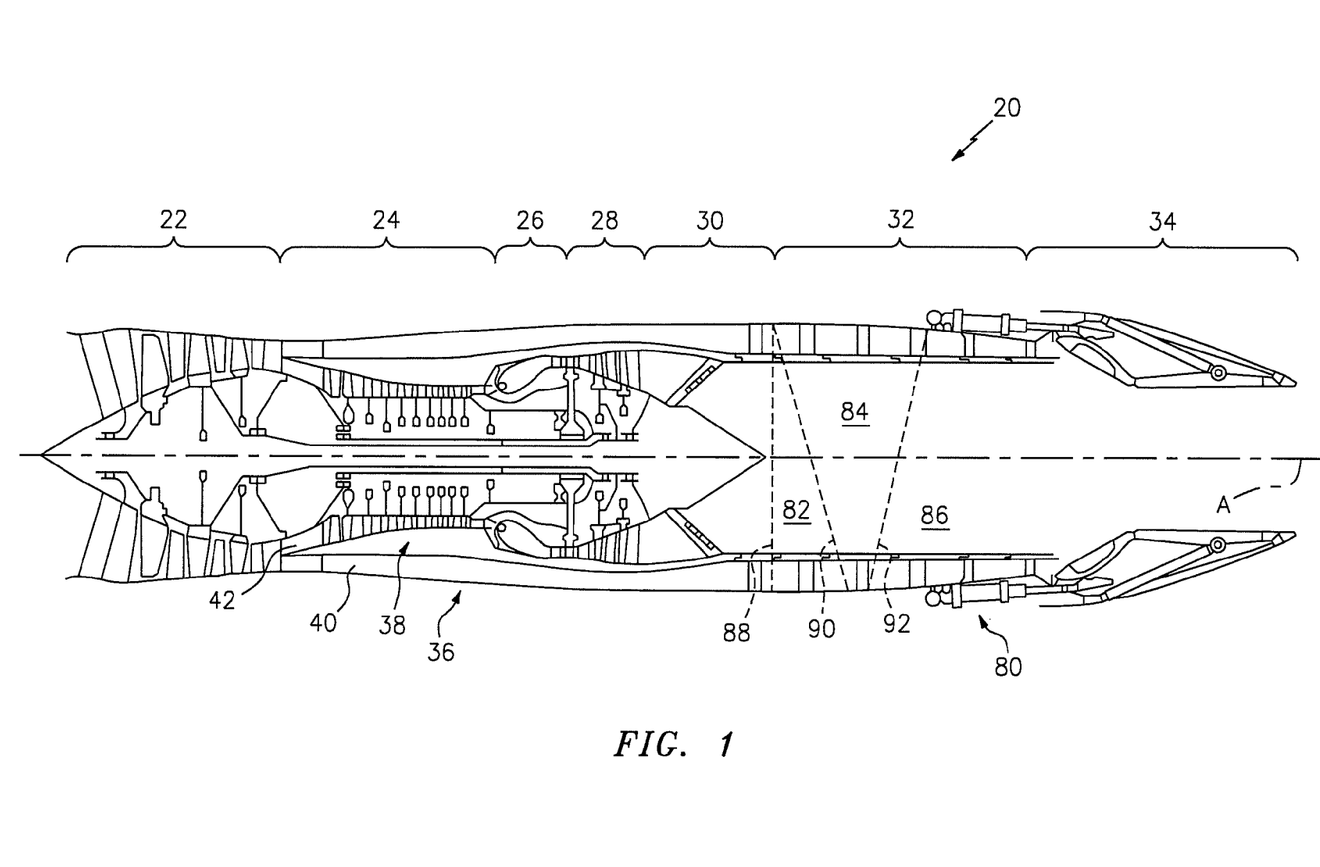
FIG. 1 is a general schematic, cross-sectional view of an exemplary gas turbine engine.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmentor section 30, an exhaust duct section 32, and a nozzle section 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case structure 36 defines a generally annular secondary airflow path 40 around a core airflow path 42. Various case structures and modules may define the engine case structure 36 which essentially defines an exoskeleton to support the rotational hardware.

Air that enters the fan section 22 is divided between a core airflow through the core airflow path 42 and a secondary airflow through the secondary airflow path 40. The core airflow passes through the combustor section 26, the turbine section 28, then the augmentor section 30 where fuel may be selectively injected and burned to generate additional thrust through the exhaust duct section 32 and the nozzle section 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

Figure 2:
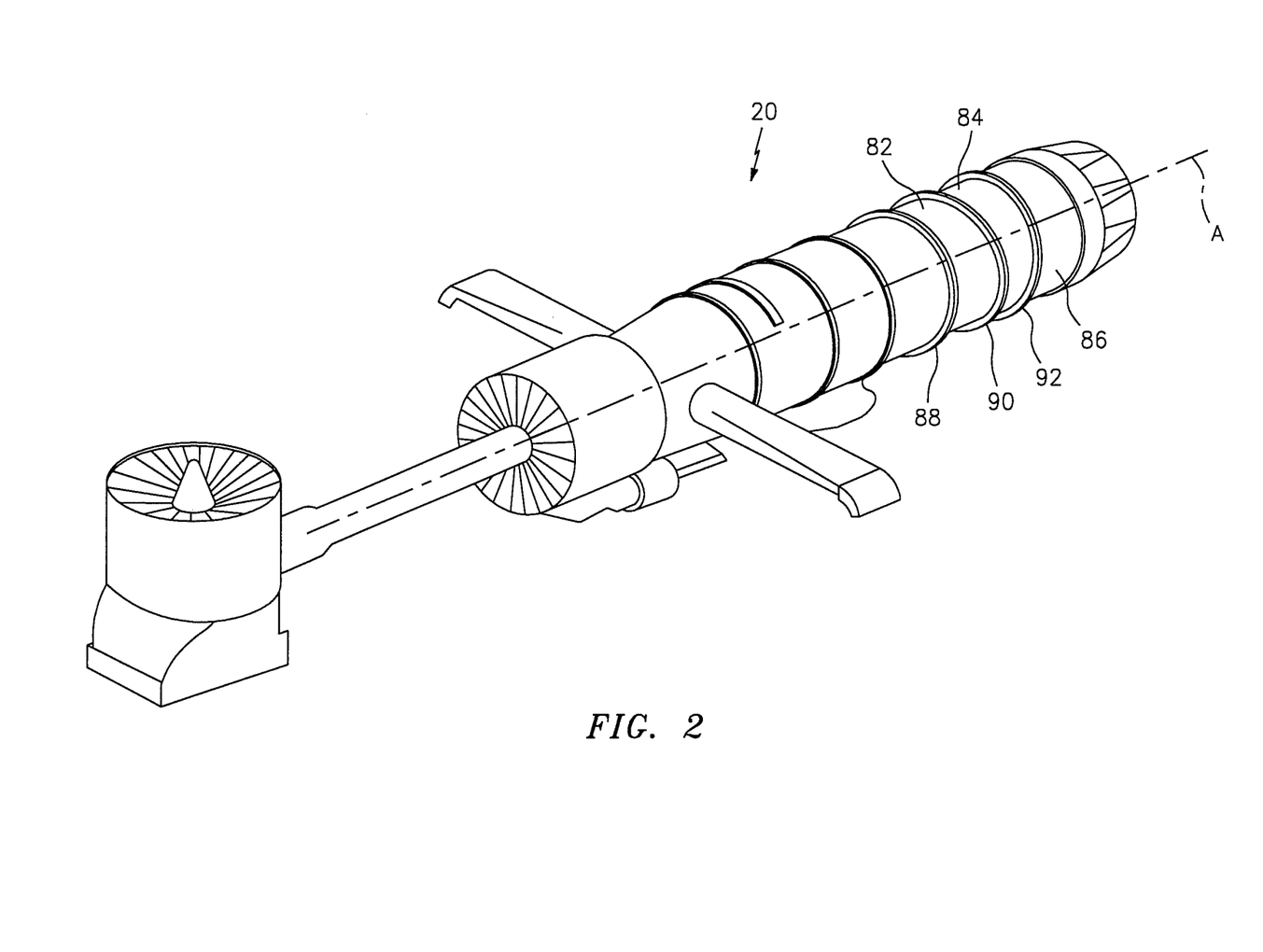
FIG. 2 is a general schematic isometric view of the gas turbine engine of FIG. 1 within a short takeoff vertical landing (STOVL) installation in a forward flight configuration.
Figure 3:
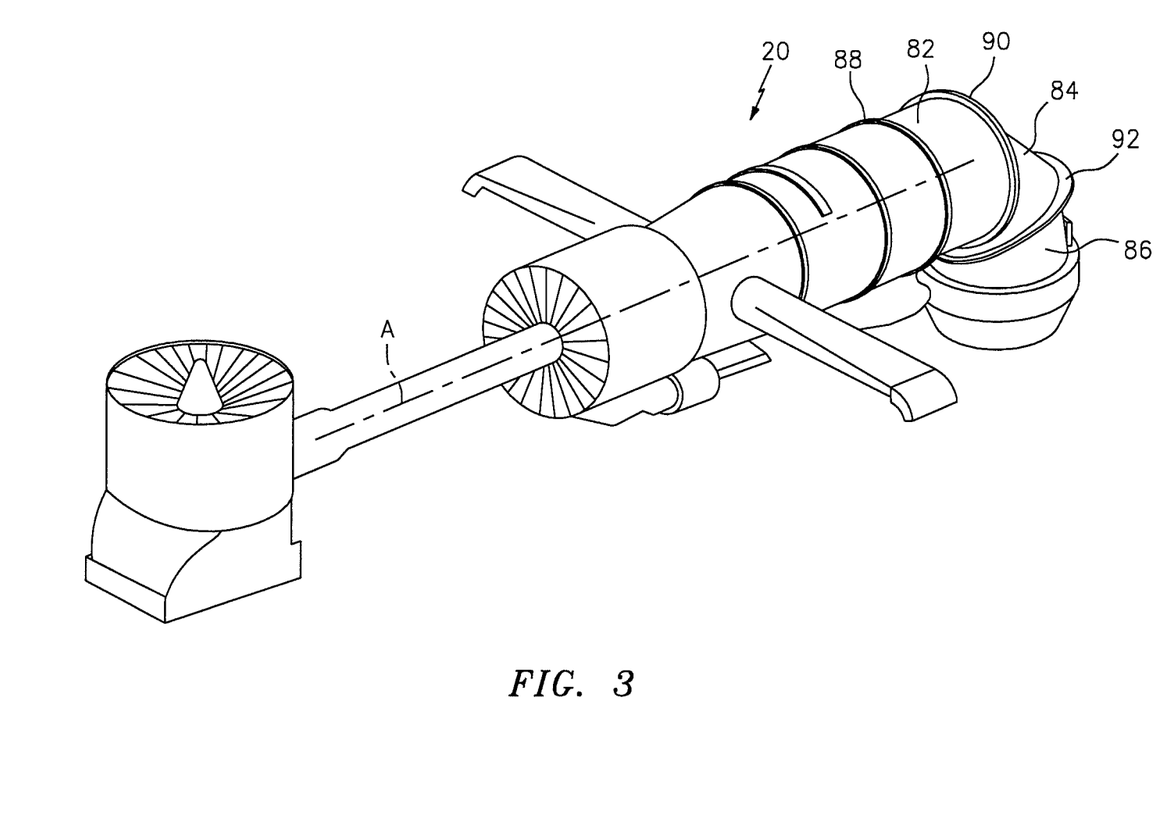
FIG. 3 is a general schematic isometric view of the gas turbine engine of FIG. 1 within a short takeoff vertical landing (STOVL) installation in a hover configuration.

The exhaust duct section 32, in one disclosed non-limiting embodiment, includes a three-bearing swivel duct (3BSD) 80 (illustrated schematically) for use in a short take off vertical landing (STOVL) type of aircraft. The 3BSD 80 includes three exhaust ducts 82, 84, 86 which rotate relative to each other about three bearing planes 88, 90, 92 to permit transition between a cruise configuration (see FIG. 2) in which the 3BSD 80 is arranged along the central longitudinal engine axis A and a hover configuration (see FIG. 3) in which the 3BSD 80 articulates the nozzle section 34 to a position transverse to the central longitudinal engine axis A. It should be appreciated that the three exhaust ducts 82, 84, 86 need not be of circular cross-section and various geometric cross-sections such as oval or rectilinear may be provided so long as the geometric cross-sections at the three bearing planes 88, 90, 92 are circular to penult relative rotation.

Figure 4:
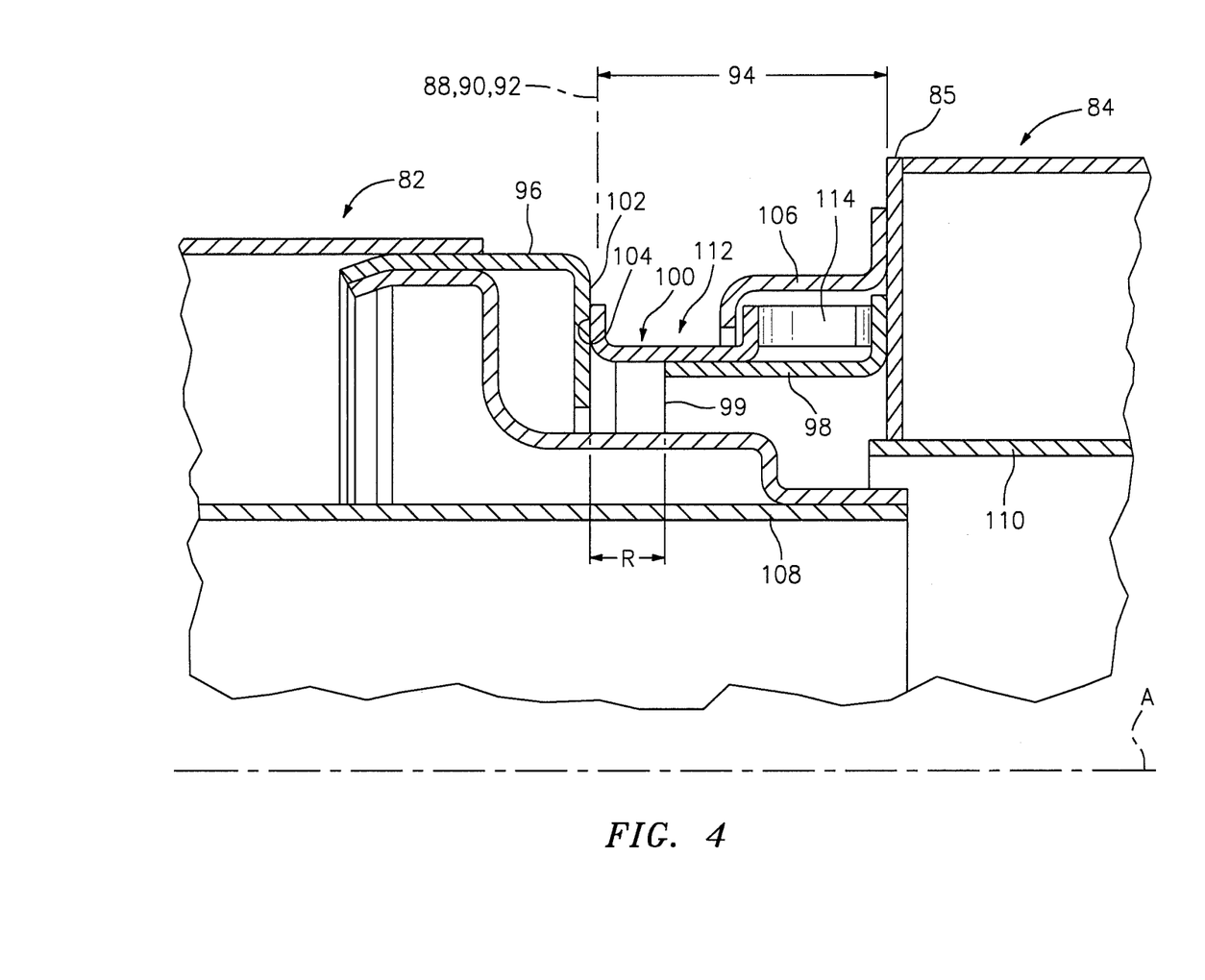
FIG. 4 is radial section of a seal assembly between an example first and second exhaust duct at a rotational interface therebetween.

With reference to FIG. 4, each of the three bearing planes 88, 90, 92 includes a respective circular seal assembly 94. Each seal assembly 94 operates to isolate the relatively large diameter fluid flow paths of the 3BSD 80, which, for example, may be about 18-72 inches (450-1830 mm) in diameter. As defined herein, the term fluid can refer to gases, vapors and/or substantially incompressible liquids.

The combination of large diameters and wide operating temperature ranges requires the seal assembly 94 to accommodate significant movements in both the radial and axial directions. In particular, for STOVL type aircraft, the axial movement provided by the radial faced seal may be, typically, about one third of the installed width of the seal. For example, on a 39 inch (1000 mm) diameter seal, the installed width is about 1 inch (25 mm) and the axial travel required on the dynamic sealing component is approximately about 0.276 inches (7 mm). It should be appreciated that although described herein with respect to a STOVL type of aircraft, the seal assembly 94 may be utilized in other architectures to include, for example, conventional takeoff and landing (CTOL) aircraft exhaust ducts which are not be vectored, other sections such as a convergent-divergent type nozzle section and other engine architectures such as a variable cycle engine architecture to seal a third stream airflow path.

The seal assembly 94 within, for example, the bearing plane 90 between exhaust ducts 82, 84 is received between base plate 96 mounted to the exhaust duct 82 and an annular bulkhead 85 mounted to the exhaust duct 84 with a spring seal 100 located axially herebetween. The back plate 96 defines a first seal surface 102 and the spring seal 100 defines a second seal surface 104 for rotation thereto. The seal carrier 98 and a seal retainer 106 may be mounted to the annular bulkhead 85 via welding or other interface to radially support the spring seal 100. The spring seal 100 is located radially outboard of a liner 108, 110 of the respective exhaust ducts 82, 84, 86 (only the two liner sections 108, 110 of the associated exhaust duct 82 and 84 are shown).

The seal assembly 94 provides for axial growth and circumferential rotation of the exhaust ducts 82, 84, 86 in relation to each other and other engine modules. The relative circular rotation occurs in the seal assembly 94 between the radial plane arranged first and second seal surface 102, 104, whilst an axial range of movement R required to accommodate thermal expansion occurs between the first seal surface 102 and an edge 99 of the seal carrier 98.

Figure 5:
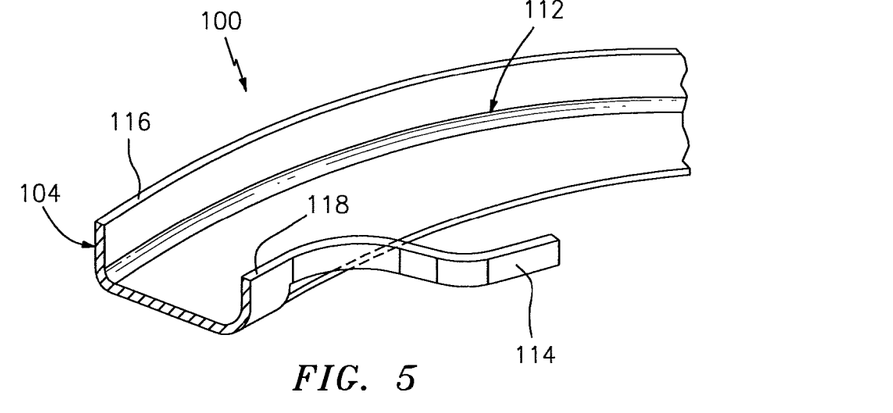
FIG. 5 is radial section of a spring seal.
Figure 6:
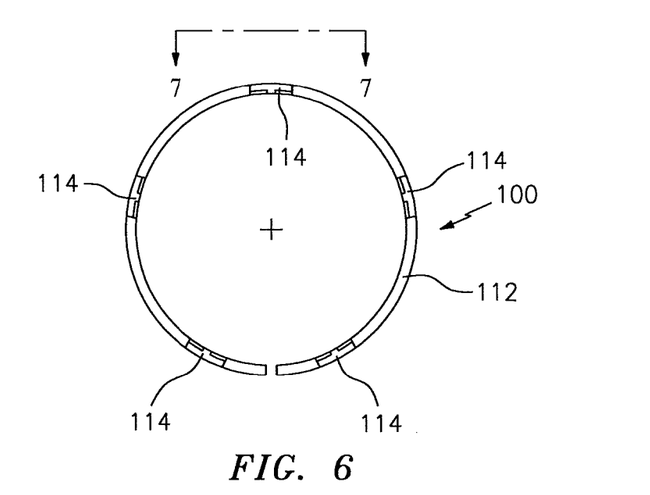
FIG. 6 is face view of the spring seal of FIG. 5.
Figure 7:
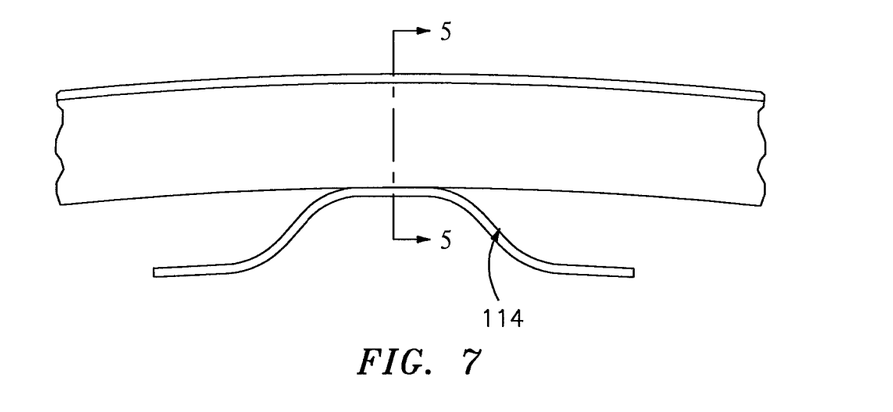
FIG. 7 is top view of the spring seal of FIG. 5.

With reference to FIG. 5, the spring seal 100 according to one disclosed non-limiting embodiment generally includes a split hoop 112 (see FIG. 6) that defines the second seal surface 104 and a multiple of springs 114 (best seen in FIG. 7). The split hoop 112, in one disclosed non-limiting embodiment, is U-shaped in cross-section and includes a first radial extension 116 and a second radial extension 118 axially displaced from the first radial extension 116. It should be appreciated that the split hoop 112 may be of various geometric cross-sections such as an L-shape and others so long as seal surface 104 is defined thereby.

The first radial extension 116 defines the second seal surface 104 while the second radial extension 118 defines the multiple of springs 114. In this disclosed non-limiting embodiment, the multiple of springs 114 (five shown in FIG. 6) are integral arcuate arms that are displaced axially from the second radial extension 118. It should be appreciated that various spring geometries such as leaf springs, wave springs and others may alternatively be utilized.

Referring to FIGS. 4 and 5, the multiple of springs 114 provide an integral axial force to maintain the rotational contact between the first seal surface 102 and the second seal surface 104 and thereby provide a fluid seal. That is, the multiple of springs 114 react against with the seal carrier 98 to generate the axial force on the split hoop 112 to drive and maintain the second seal surface 104 into contact with the first seal surface 102 yet accommodate the axial range of movement R.

The second radial extension 118 may also radially overlap with the seal retainer 106 to radially retain the spring seal 100. That is, the seal retainer 106 provides an outer retainer for the spring seal 100.

Due to variances in tolerances of the interfaces, the thermal growths and pressure deflections, the seal assembly 94 accommodates significant compression and expansion. To maintain accommodate these and other variances, the multiple of springs 114 provide a pre-load mechanism to maintain the first seal surface 102 in contact with the second seal surface 104.

Figure 8:
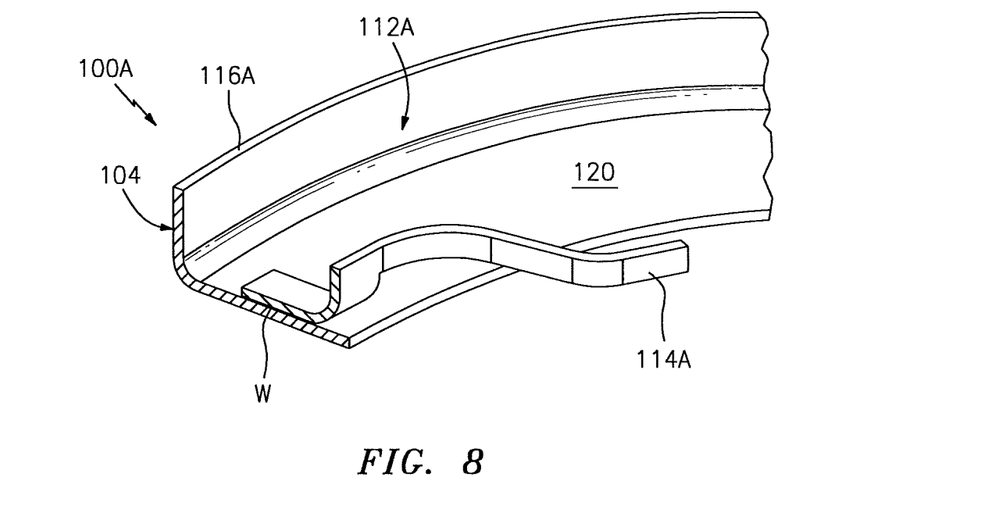
FIG. 8 is radial section of another spring seal.
Figure 9:
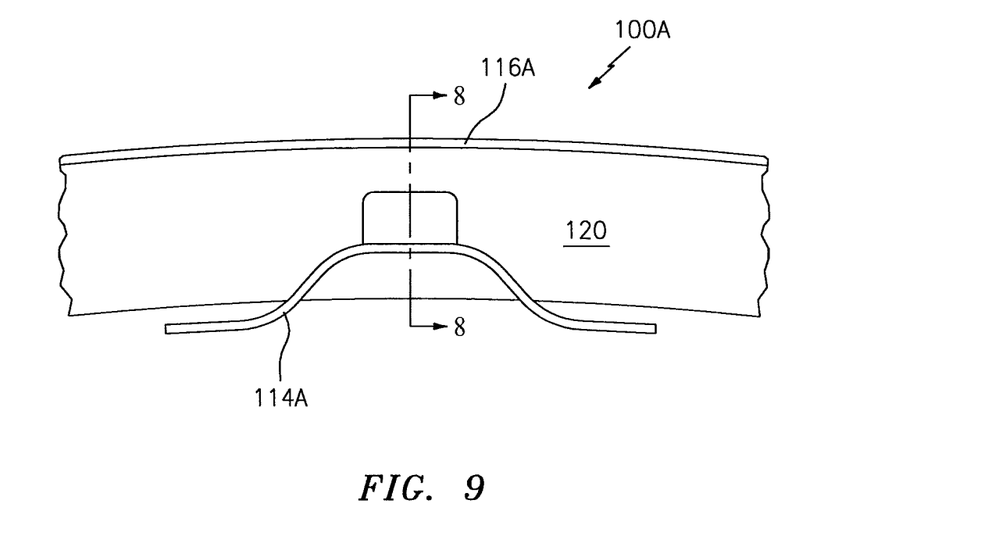
FIG. 9 is top view of the spring seal of FIG. 8.
Figure 10:
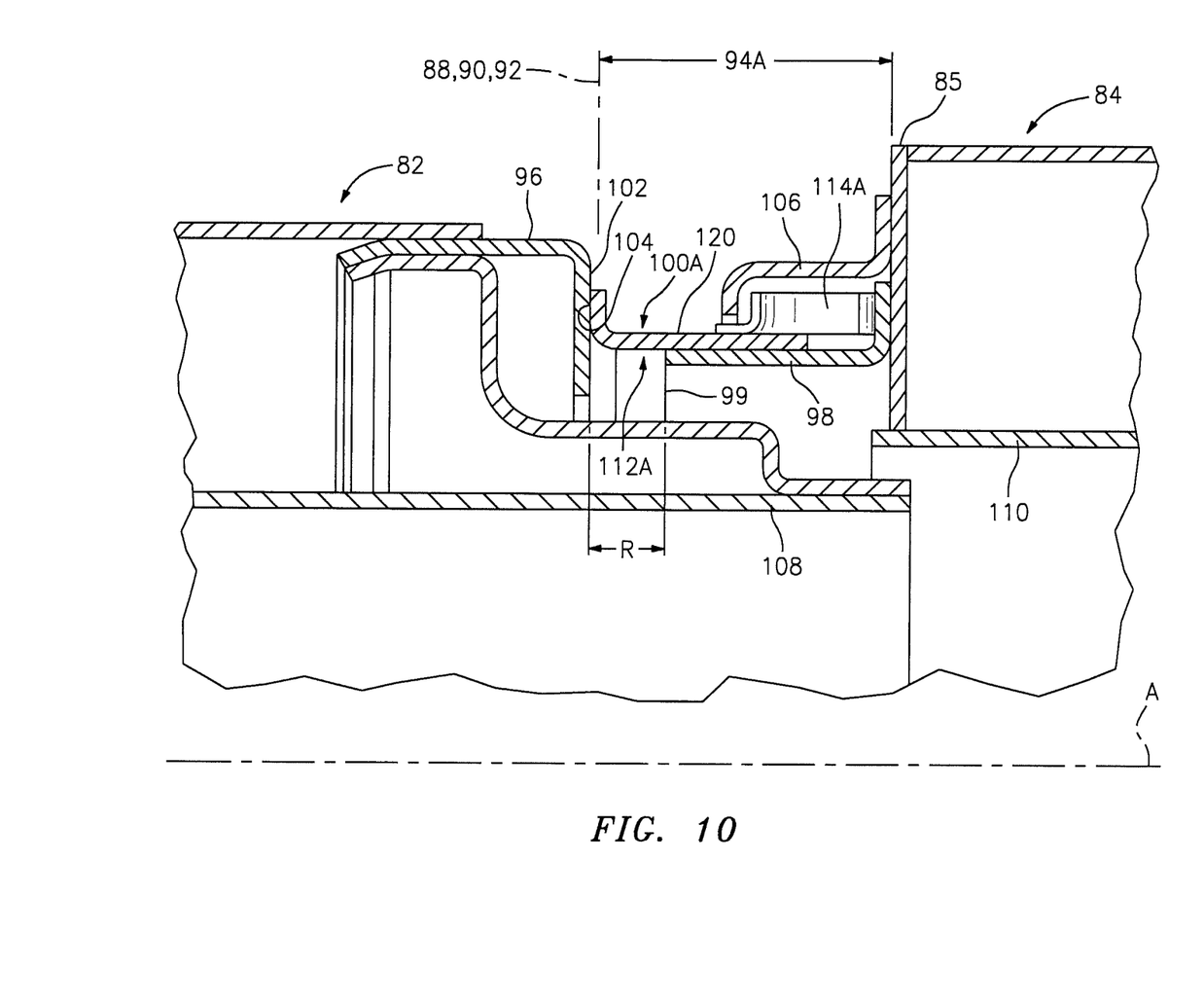
FIG. 10 is radial section of a seal assembly between an example first and second exhaust duct at a rotational interface therebetween with the spring seal of FIG. 8.

With reference to FIG. 8, a spring seal 100A according to another disclosed non-limiting embodiment includes an L-shaped split hoop 112A with the multiple of springs 114A metallurgically attached at W via welding, brazing or other method to an outer axial surface 120 downstream of the first radial extension 116A (see FIG. 9). The spring seal 100A is assembled into a seal assembly 94A (see FIG. 10) as generally described above.

Figure 11:
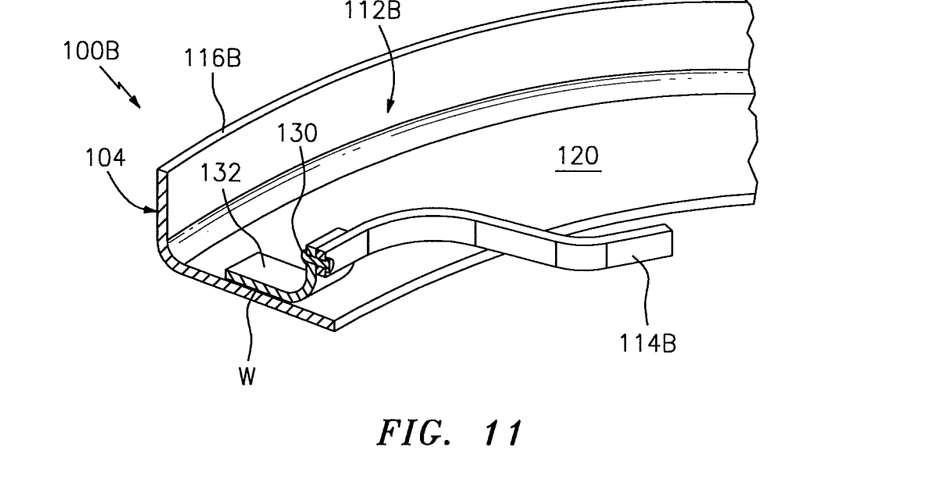
FIG. 11 is radial section of another spring seal.
Figure 12:
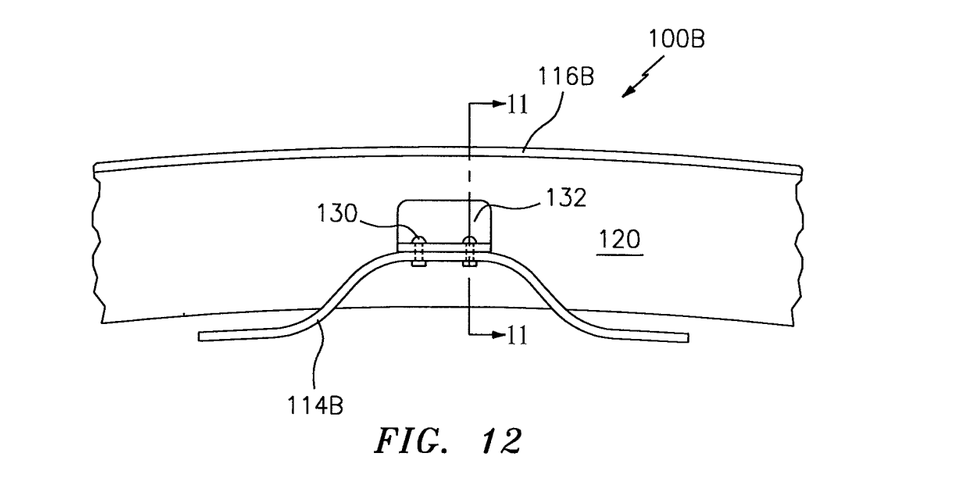
FIG. 12 is top view of the spring seal of FIG. 11.

With reference to FIG. 11, the spring seal 100B according to another disclosed non-limiting embodiment mechanically fastens the multiple of springs 114B to a bracket 132 that radially extends from the split hoop 112B through rivets 130. It should be appreciated that other fastener arrangements may alternatively or additionally be provided.

The spring seal reduces the complexity of the seal assembly 94 as relatively fewer retention features are required which also advantageously reduces weight.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An exhaust duct section for a gas turbine engine, the exhaust duct section comprising:
    a first exhaust duct;
    a second exhaust duct adjacent to said first exhaust duct; and
    a seal assembly between said first exhaust duct and said second exhaust duct, wherein said seal assembly includes a split hoop with a seal surface that interfaces with said first exhaust duct and a multiple of springs that extend from said split hoop, and wherein said multiple of springs interface with said second exhaust duct;
    wherein each of said multiple of springs includes a respective distal and unsupported end that is disposed an axial distance away from said split hoop, and each of said multiple of springs is fixed to said split hoop and projects out from said split hoop to said respective distal and unsupported end;
    wherein said multiple of springs include a first spring and a second spring; and
    wherein said first spring and said second spring project out from said split hoop in opposite circumferential directions.

2. The exhaust duct section as recited in claim 1, wherein said seal assembly is radially outboard of an exhaust duct liner.

3. The exhaust duct section as recited in claim 1, wherein said seal assembly accommodates axial displacement between said first exhaust duct and said second exhaust duct.

4. The exhaust duct section as recited in claim 3, wherein said seal assembly accommodates rotation of said first exhaust duct relative to said second exhaust duct.

5. The exhaust duct section as recited in claim 1, wherein said split hoop is U-shaped in cross-section.

6. The exhaust duct section as recited in claim 1, wherein said split hoop is L-shaped in cross-section.

7. The exhaust duct section as recited in claim 1, wherein said split hoop is radially outboard of a seal carrier.

8. The exhaust duct section as recited in claim 7, wherein said seal carrier is mounted to an annular bulkhead of said second exhaust duct.

9. The exhaust duct section as recited in claim 8, wherein said multiple of springs is radially inboard of a seal retainer.

10. The exhaust duct section as recited in claim 9, wherein said seal retainer is mounted to said annular bulkhead of said second exhaust duct.

11. The exhaust duct section as recited in claim 1, wherein said seal surface interfaces with said first exhaust duct at a back plate.

12. The exhaust duct section as recited in claim 11, wherein said seal surface interfaces with said first exhaust duct at a bearing plane to accommodate rotation of said first exhaust duct relative to said second exhaust duct.

13. The exhaust duct section as recited in claim 12, wherein said seal assembly accommodates axial displacement between said first exhaust duct and said second exhaust duct, and said multiple of springs maintains said seal surface interface with said back plate.

14. The assembly of claim 1, wherein said multiple of springs and said split hoop are formed integrally together as a single monolithic body.

15. A seal assembly for an exhaust duct section of a gas turbine engine, the assembly comprising:
a split hoop that defines a seal surface; and
a multiple of springs that axially extend from said split hoop opposite said seal surface, and include a first spring and a second spring;
wherein said first spring is cantilevered from and fixed to said split hoop;
wherein said second spring is cantilevered from and fixed to said split hoop; and
wherein said first spring and said second spring project out from said split hoop in different circumferential directions.

16. The assembly as recited in claim 15, wherein said split hoop is U-shaped in cross-section.

17. The assembly as recited in claim 15, wherein said split hoop is L-shaped in cross-section.

18. The assembly as recited in claim 15, wherein said multiple of springs and said split hoop are formed integrally together as a single monolithic body.

19. The assembly as recited in claim 15, wherein each of said multiple of springs is a discrete body and welded to said split hoop.

20. The assembly as recited in claim 15, wherein each of said multiple of springs is a discrete body and fastened to said split hoop.

* * * * *

UNITED STATES PATENT AND TRADEMARK OFFICE
CERTIFICATE OF CORRECTION

PATENT NO. : 9,915,228 B2
APPLICATION NO. : 14/305606
DATED : March 13, 2018
INVENTOR(S) : Peters et al.

Page 1 of 1

It is certified that error appears in the above-identified patent and that said Letters Patent is hereby corrected as shown below:

In the Specification

Column 4, Line 29, please delete "penult" and insert --permit--.

Signed and Sealed this
Twenty-ninth Day of May, 2018

Andrei Iancu
*Director of the United States Patent and Trademark Office*